United States Patent
Aravot

(10) Patent No.: US 10,496,431 B2
(45) Date of Patent: Dec. 3, 2019

(54) VIRTUAL MACHINE STORAGE OPERATION PROGRESS TRACKING

(71) Applicant: Red Hat Israel, Ltd., Raanana (IL)

(72) Inventor: Liron Aravot, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 160 days.

(21) Appl. No.: 15/851,560

(22) Filed: Dec. 21, 2017

(65) Prior Publication Data

US 2019/0034217 A1 Jan. 31, 2019

Related U.S. Application Data

(60) Provisional application No. 62/539,378, filed on Jul. 31, 2017.

(51) Int. Cl.
*G06F 9/455* (2018.01)
*G06F 3/06* (2006.01)

(52) U.S. Cl.
CPC .......... *G06F 9/45558* (2013.01); *G06F 3/065* (2013.01); *G06F 3/0605* (2013.01); *G06F 3/067* (2013.01); *G06F 3/0619* (2013.01); *G06F 3/0647* (2013.01); *G06F 3/0664* (2013.01);
(Continued)

(58) Field of Classification Search
CPC .. G06F 9/45558; G06F 3/0619; G06F 3/0664; G06F 3/067; G06F 3/065; G06F 2009/45562; G06F 2009/4557; G06F 2009/45591
See application file for complete search history.

(56) References Cited

U.S. PATENT DOCUMENTS 8,260,840 B1 * 9/2012 Sirota .................. G06F 9/5061
370/216
8,296,419 B1 * 10/2012 Khanna ................ G06F 9/5072
709/201
(Continued)

OTHER PUBLICATIONS

Unknown. Feb. 6, 2017. "High-Performance Premium Storage and unmanaged and managed Azure VM Disks". Microsoft Azure. https://docs.microsoft.com/en-us/azure/storage/storage-premium-storage. Retrieved on Mar. 24, 2017. 15 pages.
(Continued)

*Primary Examiner* — Adam Lee
(74) *Attorney, Agent, or Firm* — Lowenstein Sandler LLP

(57) ABSTRACT

A method includes receiving a request to perform a virtual machine (VM) copy operation that copies the VM from a source to a target location. The VM includes a hierarchy of storage components in levels. The operation includes a first and second sub-operation for each storage component at a lowest level in the hierarchy. The method includes transmitting a VM copy instruction, identifying a weight assigned to each storage component in the hierarchy, the weight based on a property of a storage component. The weight of the storage component at the lowest level is divided into first and second weight portions. The method also includes receiving a completion percentage for the sub-operations, determining an overall completion progress percentage of the operation using the sub-operation completion percentages and the weight portions for each storage component at the lowest level, and transmitting the overall completion percentage.

20 Claims, 6 Drawing Sheets

(52) U.S. Cl.
CPC ............... *G06F 2009/4557* (2013.01); *G06F 2009/45562* (2013.01); *G06F 2009/45591* (2013.01)

(56) References Cited

U.S. PATENT DOCUMENTS

| | | | |
|---|---|---|---|
| 8,370,679 B1* | 2/2013 | Gawali | G06F 11/2023 714/25 |
| 8,418,181 B1* | 4/2013 | Sirota | H04L 67/00 709/201 |
| 8,443,166 B2 | 5/2013 | Czezatke et al. | |
| 9,354,907 B1 | 5/2016 | Teli et al. | |
| 9,417,968 B2 | 8/2016 | Dornemann et al. | |
| 9,436,492 B2 | 9/2016 | Wright et al. | |
| 9,501,379 B2 | 11/2016 | Gill et al. | |
| 9,977,704 B1* | 5/2018 | Chopra | G06F 11/0709 |
| 2003/0188116 A1* | 10/2003 | Suzuki | G06F 3/0611 711/162 |
| 2009/0228676 A1* | 9/2009 | Naganuma | G06F 3/0605 711/173 |
| 2010/0299667 A1* | 11/2010 | Ahmad | G06F 12/1018 718/1 |
| 2011/0153697 A1* | 6/2011 | Nickolov | G06F 9/4856 707/827 |
| 2011/0191533 A1* | 8/2011 | Coulter | G06Q 10/00 711/112 |
| 2013/0086308 A1* | 4/2013 | Nakata | G06F 3/0611 711/103 |
| 2015/0154040 A1* | 6/2015 | Inada | G06F 11/1464 718/1 |
| 2015/0242224 A1 | 8/2015 | Simoncelli | |
| 2015/0324227 A1 | 11/2015 | Sizemore | |
| 2016/0203069 A1* | 7/2016 | Gill | G06F 11/3034 709/224 |
| 2016/0226946 A1 | 8/2016 | Karaatanassov et al. | |
| 2016/0246628 A1* | 8/2016 | Litke | G06F 9/45558 |
| 2018/0018344 A1* | 1/2018 | Kilaru | G06F 11/1466 |
| 2019/0073150 A1* | 3/2019 | Nasu | G06F 3/0604 |

OTHER PUBLICATIONS

Unknown. "8.6. Disable SMART Disk Monitoring for Guest Virtual Machines". Red Hat. https://access.redhat.com/documentation/en-US/Red_Hat_Enterprise_Linux/6/html/Virtualization_Administration_Guide/sect-Virtualization-Tips_and_tricks-Disable_SMART_disk_monitoring_for_guests.html. Retrieved on Mar. 24, 2017. 2 pages.

* cited by examiner

VIRTUAL MACHINE STORAGE OPERATION PROGRESS TRACKING

RELATED APPLICATIONS

This patent application claims the benefit under 35 U.S.C. § 119(e) of U.S. Provisional Application No. 62/539,378, filed Jul. 31, 2017, which is herein incorporated by reference.

TECHNICAL FIELD

The present disclosure is generally related to virtualization, and is more specifically related to virtual machine storage operation progress tracking.

BACKGROUND

Data centers may include clusters consisting of multiple hosts (e.g., physical servers) in racks. Hypervisors may operate on each host to create and run virtual machines (VMs). VMs emulate computer systems and may be referred to as guest machines. VMs may be associated with one or more disks in storage of their respective hosts. Each disk may include numerous volumes. In some instances, it may be desirable to clone a VM from a source host to a target host. For example, the VM may be cloned to create a backup copy on the target host that can be accessed in case the VM is corrupted or the source host fails. When performing a clone operation of a VM from a source host to a target host, VM configuration and VM data, including the disks and associated volumes, are copied.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
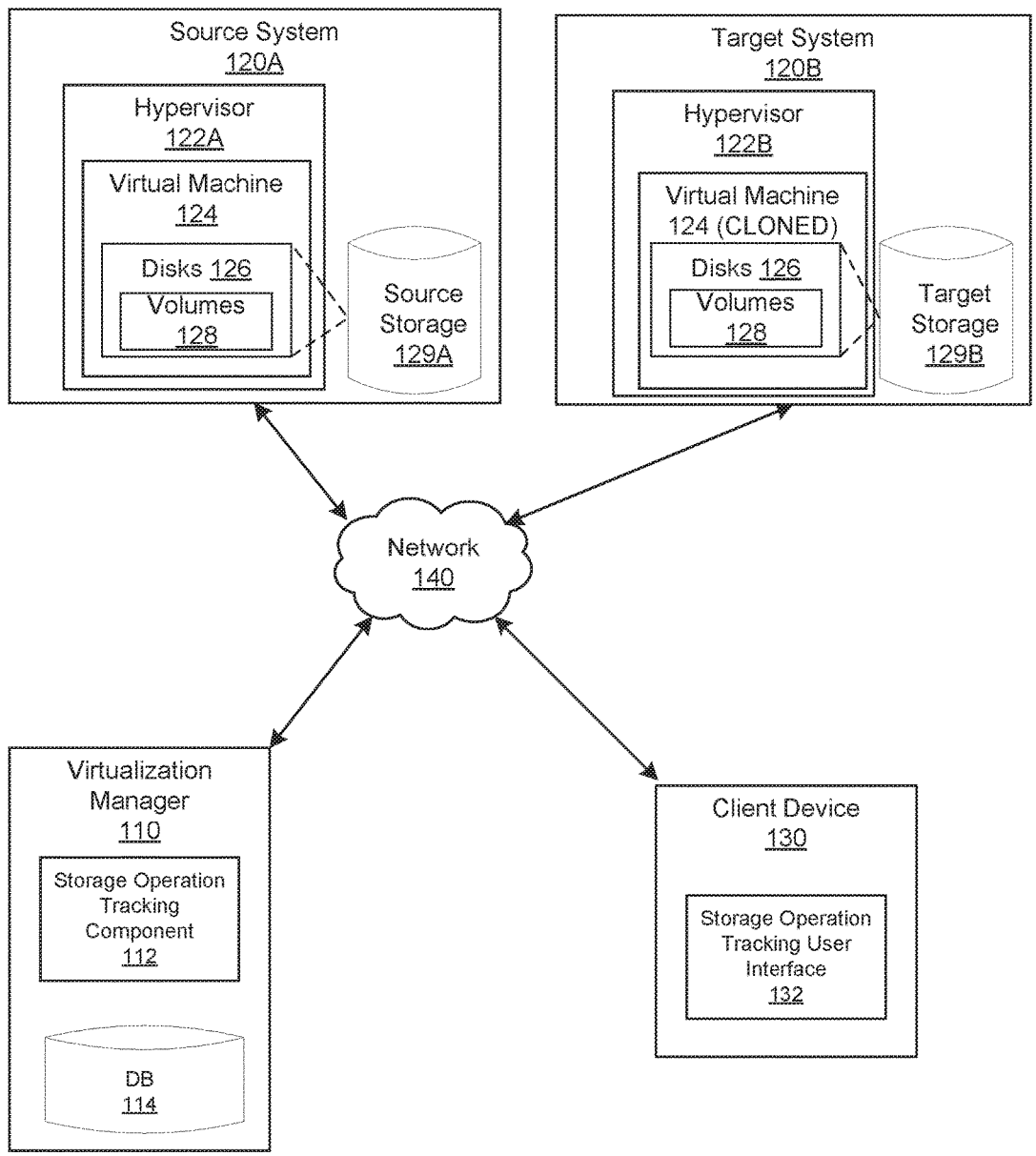
FIG. 1 depicts a high-level diagram of an example system architecture operating in accordance with one or more aspects of the present disclosure.

In a managed virtualization environment, a virtual machine (VM) may be instantiated using one or more storage components. For example, the VM may include one or more disks. Each disk may be made up of a chain of volumes, where each volume in the chain represents a snapshot of the particular disk and includes a unique identifier. In some instances, snapshots may be created for the VM on a periodic or scheduled basis. A snapshot may refer to a state of the disks associated with the VM at a particular point in time. Whenever a snapshot is created for the disks, a new volume is created and the changes from the previous volume are written to the new volume by the VM. Thus, there may be numerous volumes associated with a VM as snapshots are created.

In some instances, for example, to aid in disaster recovery, a backup of the VM may be made by cloning the VM from a source system (e.g., host/physical machine) to a target system. An administrator of the managed virtualization environment may instruct a virtualization manager to clone the VM. As such, the virtualization manager may cause the VM configuration (e.g., virtual processors, memory, virtual network adapters, cluster, guest operating system, display) and the data associated with the VM to be copied from the source system to the target system. Depending on the actual size of the disks associated with the VM, the clone operation may take an extended amount of time (e.g., hours, days, a week, etc.). Further, during conventional cloning operations, there may not be any indication of when the cloning operation will complete or the current progress of the cloning operation.

Accordingly, aspects of the present disclosure are directed to determining and providing accurate progresses for high level storage entities (e.g., the VM and/or disks associated with the VM) according to progresses of copy operations performed on actual low level storage entities (e.g., volumes associated with the disks) associated with the VM(s) being copied. In an implementation, the progresses may be determined and displayed for each level of a hierarchy (e.g., tree) of storage components associated with the VM. The hierarchy may include a VM level at a top level, a volume level including a set of volumes at a lowest level in the hierarchy, and a disk level including a set of disks associated with the VM at a level preceding the volume level and following the VM level. As described in detail below, the virtualization manager may perform one or more sub-operations for each volume copied during a VM copy operation.

In an implementation, the virtualization manager may assign weights to each storage component at each level in the hierarchy and to each of the one or more sub-operations associated with each volume based on one or more properties (e.g., actual size of storage component, speed of storage component, state of storage component, etc.) of the storage components and/or configuration setting. An application executing the volume sub-operations on the source system may report a completion progress of the sub-operations to the virtualization manager. The virtualization manager may use the completion progresses of the sub-operations and the weights assigned to the sub-operations to determine completion percentages for each of the sub-operations. The completion percentages of the sub-operations may be used to determine completion percentages for each corresponding volume at the volume level. The completion percentages of the volumes may be used to determine completion percentages for each corresponding disk at the disk level. The completion percentages of the disks may be used to determine an overall completion percentage for the VM at the VM level.

In this way, accurate completion percentages may be determined for each level in the hierarchy of storage components based on progresses of operations performed on the actual low level storage components (e.g., volumes) associated with the VM. One or more of the completion percentages may be transmitted to a client device and displayed via a user interface (UI). The techniques described herein may improve VM cloning operations by providing accurate indications of the progress of the VM cloning operations that may enable certain operations to be performed. For example, if a particular disk is slowing down, the progress for the copy operation may similarly slow down and appropriate maintenance and/or replacement of the disk may be performed when performance of the disk degrades below a threshold. Further, the accurate completion percentages may enable scheduling of the VM cloning operations in an efficient manner. For example, certain VM cloning operations that are indicated as performing slowly via the completion percentage may be halted to allow other VM cloning operations that are progressing more quickly to finish. Thus, in some examples, the techniques described herein may improve the overall operation of the hosts that are performing VM cloning operations.

FIG. 1 illustrates an example system architecture 100 in which implementations of the disclosure may operate. The system architecture 100 may include a virtualization manager 110, a plurality of host systems 120A (hereinafter "source system 120A") and 120B (hereinafter "target system 120B"), and a client device 130 coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, networks 140 may include a wired infrastructure (e.g., Ethernet).

The source system 120A and the target system 120B may comprise one or more processors communicatively coupled to memory devices and input/output (I/O) devices. The source system 120A and the target system 120B may run a plurality of virtual machines by executing a hypervisor 122A and 122B, respectively, to abstract the physical layer, including processors, memory, and I/O devices, and present this abstraction to the virtual machines as virtual devices. For example, as depicted, hypervisor 122A may run virtual machine 124. The virtual machine 124 may execute a guest operating system that may utilize the underlying virtual devices, including virtual processors, virtual memory, and virtual I/O devices.

One or more applications may be running on a virtual machine under the guest operating system. The hypervisors 122A and 122B may create, run, manage, and monitor various aspects of virtual machines operation, including the processing, and storage, memory, and network interfaces. In an illustrative example, hypervisors 122A and 122B may be provided by a Virtual Desktop and Server Management (VDSM) daemon (not shown). The VDSM daemon may include an application programming interface (API) with which the virtualization manager 110 interfaces.

The VDSM or any suitable application executing on of the source system 120A and the target system 120B may provide status notifications to the virtualization manager 110 that indicate the operating state of the hypervisors 122A and 122B and/or the virtual machines 124. For example, the status notification may be transmitted by the VDSM or other application in response to a request from the virtualization manager 110. The status notification may indicate a completion percentage of one or more operations and/or sub-operations performed by the source system 120A and/or 120B. For example, the status notification may indicate a completion percentage for various copy operations performed for low level storage components (e.g., volumes) associated with the VM 124.

The virtualization manager 110 may be hosted by a computer system (described in more details herein below with references to FIG. 6) and include one or more computer programs executed by the computer system for centralized management of the system architecture 100. In one implementation, the virtualization manager 110 may comprise various interfaces, including administrative interface, reporting interface, and/or application programming interface (API) to communicate with the source system 120A and the target system 120B of system architecture 100, as well as to user portals, directory servers, and various other components, which are omitted from FIG. 1 for clarity.

Virtualization manager 110 may provide virtual machine cloning management and tracking to manage requests to clone existing virtual machines and track progress of the clone operation. In one example, virtualization manager 110 may include a storage operation tracking component 112 and a database 114. The storage operation tracking component 112 may be implemented as computer instructions stored on one or more tangible, non-transitory computer-readable media executed by one or more processing devices of the computer system hosting the virtualization manager 110.

In some instances, an administrator or the virtualization manager 110 may determine to clone the VM 124 from the source system 120A to the target system 120B. For example, at a predetermined interval or on-demand basis, the storage operation tracking component 112 may receive a request to perform a VM copy operation that copies the VM 124 from the source system 120A to the target system 120B. Although just the source system 120A and target system 120B are shown, any number of systems may be included in the system architecture 100. Further, multiple requests may be received to copy multiple VMs on the source system 120A or on different source systems to the target machine 120B or different target machines. The techniques disclosed herein may enable providing accurate progress tracking for a single VM copy operation or multiple VM copy operations occurring concurrently.

Returning to the single VM copy operation example, the virtualization manager 110 may instruct the source system 120A to perform the copy operation of the VM 124 to the target system 120B. The virtual machine 124 may be associated with a set of disks 126A. Each disk 126A may be associated with a chain of volumes 128A. Each volume 128A may represent a snapshot of the corresponding disk 126A at a particular point in time and may include a unique identifier. Each time a snapshot is taken, a new volume 128A is created and changes to the VM are written to the new volume 128A.

To perform the VM copy operation, the virtualization manager 110 may issue instructions to the source system 120A to clone the VM configuration (e.g., VM's properties such as CPU, memory, display, network adapter, etc.) and the VM data (e.g., disks and volumes). As such, the VM copy operation may be a lengthy operation based on the actual size of the disks/volumes associated with the VM in storage on the source system 120A. According to aspects of the present disclosure, accurate progresses for copying the various storage components associated with the VM may be determined and provided for display via the client device 130.

When a VM copy operation is being performed, the storage operation tracking component 112 may obtain one or more properties (e.g., actual size of storage component, speed of storage component, state of storage component, etc.) of the storage components associated with the VM 124 from the source system 120A. The one or more properties of the storage components may be stored in the database 114. The storage operation tracking component 112 may assign a weight to each storage component (e.g., VM(s), disk(s), volume(s)) at each level in a hierarchy in view of at least the one or more properties. For example, the storage operation tracking component 112 may assign the weight to a storage component (e.g., volume 128) at a particular level by dividing the weight assigned to an associated storage component (e.g., disk 126) in a preceding level in view of the one or more properties (e.g., actual size of the volume), as described in more detail below. The weights assigned to each storage component may be stored in the database 114.

Copying the VM 124 may include copying the disks 126 and volumes 128 associated with the VM 124 from a source storage 129A on the source system 120A to a target storage 129B on the target system 120B. A VM copy operation that copies the disks 126 associated with the VM 124 may include two sub-operations for each volume 128. The sub-operations include (i) volume structure copy and (ii) volume data copy. The first sub-operation includes cloning the volume chain structure to the target storage 129B on the target system 120B. The second sub-operation includes iterating over the volumes 128 associated with the disks 126 on the source storage 129A and issuing a copy data operation for each volume 126. Each of the sub-operations may be executed by an application (e.g., VDSM) running on the source system 120A including the desired VM 124 to be copied. Each of the sub-operations may also be assigned a weight portion based on the weight of the volume 128 associated with the sub-operations and a configuration setting, one or more properties of the associated volume, or the like. The configuration setting may include a first ratio for the volume structure copy sub-operation and a second ratio for the volume data copy sub-operation. Generally, the first ratio for the volume structure copy sub-operation is less than the second ratio for the volume copy sub-operation because it generally takes a longer amount of time to copy actual data than a structure of the data. Thus, the volume data copy may be assigned a heavier weight portion. The weight portions assigned to the sub-operations may be stored in the database 114.

An application (e.g., VDSM) on the source system 120A that performs the first and second sub-operations may report the progress of each sub-operation upon request. The storage operation tracking component 112 may determine the low level completion progress of the sub-operations performed on each of the volumes 128 associated with the VM 124 in view of the reported progress and the weight portions assigned to the sub-operations. Then, the storage operation tracking component 112 may use the completion percentages of the sub-operations to determine volume copy completion percentages for the volumes 128 at the volume level in the hierarchy. The storage operation tracking component 112 may use the volume copy completion percentages to determine disk copy completion percentages for the disks 126 at the disk level in the hierarchy. Also, the storage operation tracking component 112 may use the disk copy completion percentages to determine an overall copy completion percentage for the VM 124A at the VM level in the hierarchy. Each of the completion percentages may be stored in the database 114.

As a result of the VM copy operation completing, the target system 120B may include the volumes 128 and the disks 126 associated with the VM 124 (CLONED) stored in its target storage 129B. The VM 124 (CLONED) may serve as a backup in case of an undesirable condition (e.g., corruption, failure, etc.) occurring to the VM 124 on the source system 120A. If the undesirable condition occurs to the VM 124 on the source system 120A, the VM 124 (CLONED) on the target system 120B may be copied back to the source system 120A and restarted.

Additionally, according to some aspects of the present disclosure, the storage operation tracking component 112 may transmit the one or more completion percentages to the client device 130 to facilitate display of the one or more completion percentages. For example, the storage operation tracking component 112 may provide a storage operation tracking user interface (UI) 132 displaying one or more of the completion percentages for the sub-operations and/or the hierarchy of storage components (e.g., the volumes at the volume level, the disks at the disk level, and the VM at the VM level). In an example, the storage operation tracking UI 132 provided by the storage operation tracking component 112 may be presented by a web browser operating on the client device 130 or any suitable client-side application. The client device 130 may include any suitable computing device, such as a smartphone, tablet, laptop, desktop, server, or the like. As such, client device 130 may include one or more non-transitory, machine-readable storage media that store computer instructions and one or more processing devices that execute the stored computer instructions. For example, the client device 130 may display the storage operation tracking UI 132, receive user input via the storage operation tracking UI 132 and send corresponding data back to the virtualization manager 110 using computer instructions stored on the one or more storage media and executed by the processing devices.

In some examples, the UI 132 may include various graphical components that enable the user to select a desired existing VM on a source system and a target system to which to copy the desired existing VM. The selection of the VM to copy may cause the client device 130 to send the request to the virtualization manager 110 to initiate the VM copy operation on the particular source system. Throughout the VM copy operation and/or upon request, the storage operation tracking component 112 may transmit the completion percentages of the sub-operations and/or the hierarchy of storage components for display in the storage operation tracking UI 132. It should be noted that determining the completion percentages for the storage components in the hierarchy using the assigned weights and in view of the low level volumes 128 on which the sub-operations are actually performed may enable accurate progress tracking of the VM copy operation at each level in the hierarchy.

Figure 2:
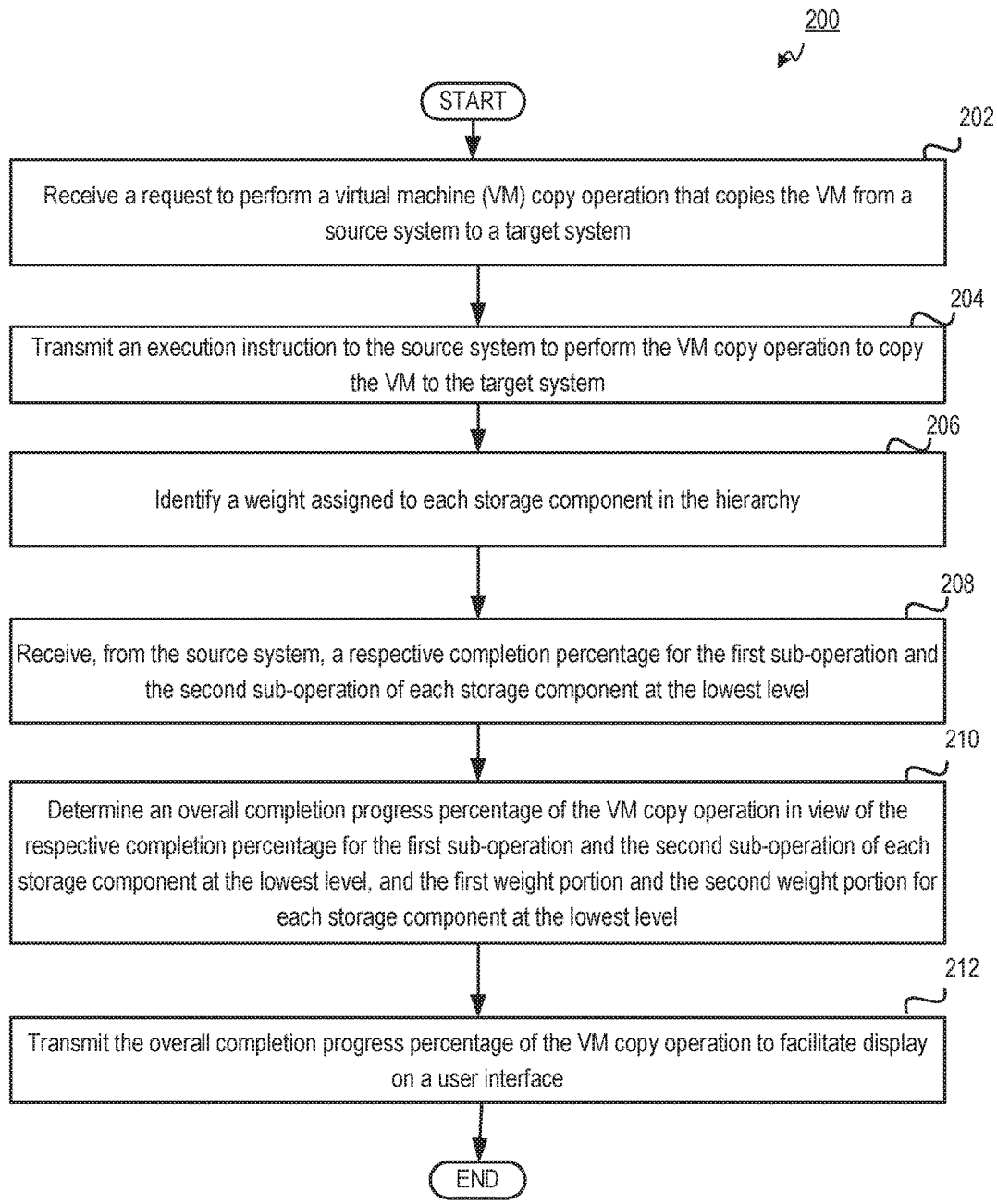
FIG. 2 depicts a flow diagram of an example method for tracking progress of storage operations via a virtualization manager, in accordance with one or more aspects of the present disclosure.

FIG. 2 depicts a flow diagram of an example method 200 for tracking progress of storage operations via a virtualization manager, in accordance with one or more aspects of the present disclosure. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by storage operation tracking component 112 executed by one or more processing devices of the computer system hosting the virtualization manager 110.

Method 200 may begin at block 202. At block 202, a processing device executing the storage operation tracking component 112 may receive a request to perform a virtual machine (VM) copy operation that copies the VM 124 from a source location 120A to a target location 120B. The VM 124 may be associated with a hierarchy of storage components (e.g., VM, disks, and volumes). The hierarchy of storage components has a plurality of levels. For example, a VM level may include one or more VM(s) 124 specified in the request, a volume level may be a lowest level in the hierarchy and may include one or more volumes 126 associated with the VM(s) 124, and a disk level may include one or more disks 128 associated with the one or more volumes 126. The disk level precedes the volume level and follows the VM level. The VM copy operation may include a first sub-operation (e.g., volume structure copy operation) and a second sub-operation (e.g., volume data copy operation) for each storage component (e.g., volume) at a lowest level in the hierarchy. The request may be received from the client device 130.

At block 204, the processing device may transmit an execution instruction to the source system 120A to perform the VM copy operation to copy the VM 124 to the target system 120B. At block 206, the processing device may identify a weight assigned to each storage component in the hierarchy. The weight may be previously assigned by the processing device executing the storage operation tracking component 112 and retrieved from the database 114 or may be dynamically assigned by the storage operation tracking component 112 and stored in the database 114. The weight may be based on at least one property (e.g., one or more of an actual storage component size, storage component read speed, storage component write speed, or storage status of the storage component, etc.) of a respective storage component. The weight of the respective storage component (e.g., volume) at the lowest level is divided into a first weight portion for the first sub-operation (e.g., volume structure copy operation) and a second weight portion for the second sub-operation (e.g., volume data copy operation) of the respective storage component in view of one or more of a preconfigured setting, an actual storage component size of the corresponding storage component, or the weight of the corresponding storage component.

In an implementation, determining the weight assigned to each disk in the disk level in the hierarchy may include the processing device obtaining a first aggregate storage component size for the storage components at the disk level by summing first actual storage component sizes of the storage components at the disk level. Also, the processing device may obtain a first storage component size ratio for each of the storage components at the disk level by dividing the first actual storage component size for that storage component by the first aggregate storage component size. The processing device may assign the weight to each of the storage components at the disk level in view of the first storage component size ratio, and the weight of the storage component at the VM level.

In an implementation, determining the weight assigned to each volume in the volume level in the hierarchy may include the processing device obtaining a second aggregate storage component size for the storage components at the volume level by summing second actual storage component sizes of the storage components at the volume level. Also, the processing device may obtain a second storage component size ratio for each of the storage components at the volume level by dividing the second actual storage component size for that storage component by the second aggregate storage component size. The processing device may assign the weight to each of the storage components at the volume level in view of the second storage component size ratio, and the weight of each of the storage components at the disk level.

At block 208, the processing device may receive, from the source system 120A, a respective completion percentage for the first sub-operation (e.g., volume structure copy operation) and the second sub-operation (e.g., volume data copy operation) of each storage component (e.g., volume) at the lowest level in the hierarchy. The completion percentages may be received in response to a request sent to an application (e.g., VDSM) executing the VM copy operation on the source system 120A.

At block 210, the processing device may determine an overall completion progress percentage of the VM copy operation in view of the respective completion percentage for the first sub-operation and the second sub-operation of each storage component at the lowest level, and the first weight portion and the second weight portion for each storage component at the lowest level. The technique for determining the overall completion progress percentage may begin with the completion percentages for the sub-operations and matriculate upwards in the hierarchy to determine the completion percentages for each preceding level.

In particular, the processing device may determine a first sub-operation completion percentage for the first sub-operation of each storage component at the lowest level by multiplying the respective completion percentage for the first sub-operation by the first weight portion for each storage component at the lowest level. The processing device may also determine a second sub-operation completion percentage for the second sub-operation of each storage component at the lowest level by multiplying the respective completion percentage for the second sub-operation by the second weight portion for each storage component for each storage component at the lowest level. The processing device may also determine, for each of the corresponding storage components at the lowest level, a first storage component copy completion percentage by summing the first sub-operation completion percentage for the first sub-operation and the second sub-operation completion percentage for the second sub-operation for each corresponding storage component at the lowest level. The processing device may also determine, for each storage component at a preceding level in the hierarchy that precedes the lowest level, a second storage component copy completion percentage by summing first storage component copy completion percentages of the corresponding storage components at the lowest level that are associated with each of the storage components at the preceding level. Then, the processing device may determine the overall completion progress percentage for the VM copy operation by summing second storage component copy completion percentages of each of the storage components at the preceding level.

At block 212, the processing device may transmit the overall completion progress percentage of the VM copy operation to facilitate display on the storage operation tracking UI 132. Additionally or alternatively, the processing device may transmit at least one of the first sub-operation completion percentages, the second sub-operation completion percentages, the first storage component copy completion percentages, or the second storage component copy completion percentages to facilitate display, via the storage operation tracking UI 132 on the client device 130, of the first sub-operation completion percentages, the second sub-operation completion percentages, the first storage component copy completion percentages, or the second storage component copy completion percentages.

Figure 3:
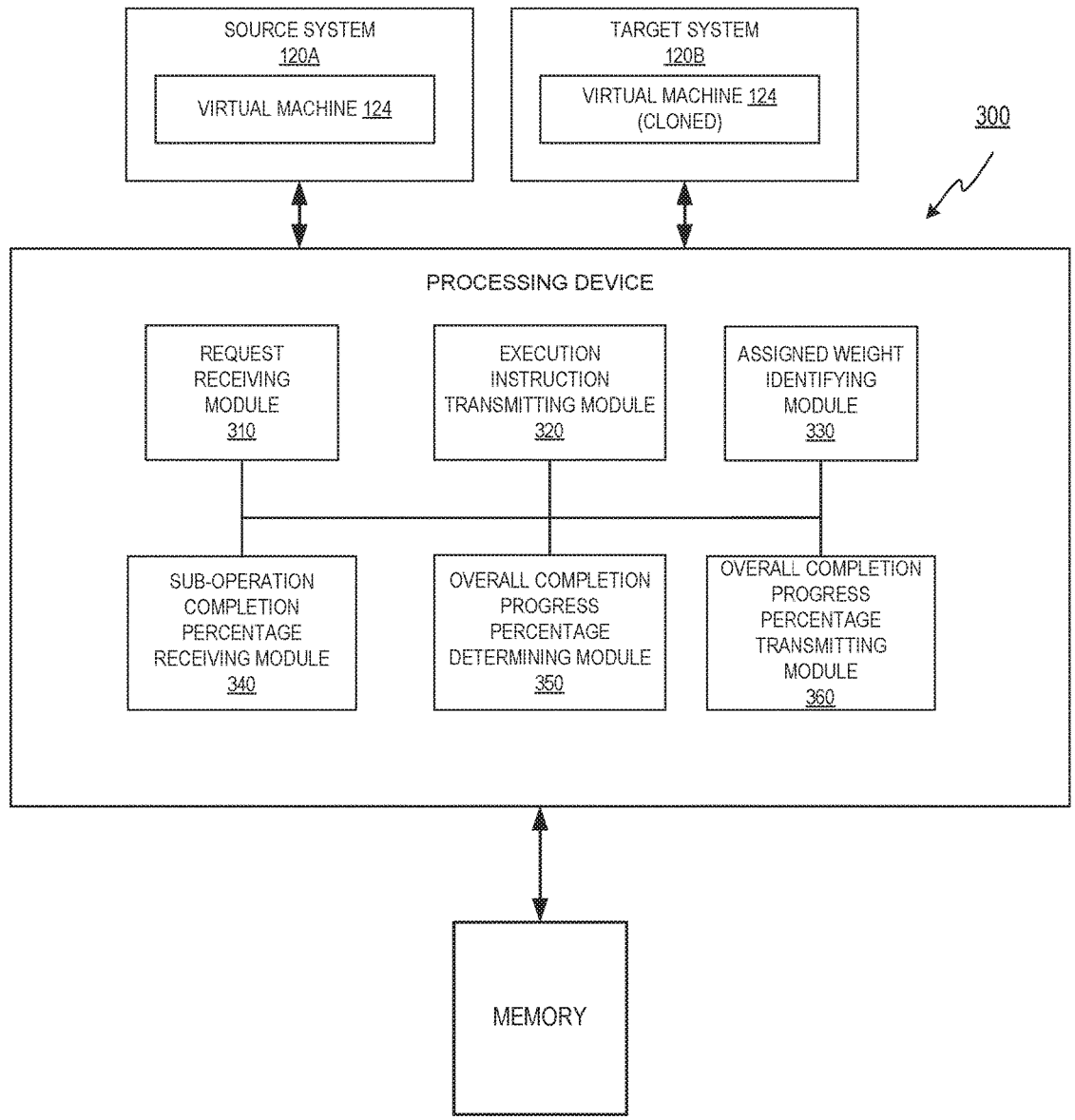
FIG. 3 depicts a block diagram of an example computer system, in accordance with one or more aspects of the present disclosure.

FIG. 3 depicts a block diagram of an example computer system 300, in accordance with one or more aspects of the present disclosure. Computer system 300 may be the same or similar to the computer system that hosts the virtualization manager 110 and may include one or more processing devices and one or more memory devices. In the example shown, computer system 300 may include request receiving module 310, execution instruction transmitting module 320, assigned weight identifying module 330, sub-operation completion percentage receiving module 340, overall completion progress percentage determining module 350, and overall completion progress percentage transmitting module 360. Also, as depicted, computer system 300 may be communicatively coupled to the source system 120A and the target system 120B.

The request receiving module 310 may receive a request to perform a virtual machine (VM) copy operation that copies the VM 124 from the source system 120A to the target system 120A. As discussed above, the VM 124 is associated with a hierarchy of storage components that has a plurality of levels (e.g., VM level, disk level, volume level). The VM copy operation may include copying the disks 126 and volumes 128 associated with the VM 124 from the source storage 129A on the source system 120A to the target storage 129B on the target system 120B. The VM copy operation includes a first sub-operation (e.g., volume structure copy operation) and a second sub-operation (e.g., volume data copy operation) for each storage component (e.g., volume) at a lowest level (e.g., volume level) in the hierarchy.

The execution instruction transmitting module 320 may transmit an execution instruction to the source system 120A to perform the VM copy operation to copy the VM 124 to the target system 120B. An application (e.g., VDSM) on the source system 120A may receive the execution instruction and begin executing the VM copy operation by performing the sub-operations for the storage components at the lowest level.

The assigned weight identifying module 330 may identify a weight assigned to each storage component in the hierarchy. The weight may be retrieved from the database 114 or may be identified by being dynamically determined and assigned to the storage components. The weights may be based on at least one property of a respective storage component. For example, the property may be an actual size, rather than a virtual size, that the storage component takes up in the source storage 129A. In another example, the property may be a storage component statistic, such as read/write speed.

The sub-operation completion percentage receiving module 340 may receive, from the source system 120A, a respective completion percentage for the first sub-operation and the second sub-operation of each storage component at the lowest level. The sub-operation completion percentages may be sent from the application (e.g., VDSM) performing the VM copy operation including the sub-operations on the source system 120A in response to a request from the virtualization manager 110 or on a periodic basis (e.g., after a certain amount of data is copied, after a the sub-operations reach various thresholds of completion, etc.).

The overall completion progress percentage determining module 350 may determine the overall completion progress percentage of the VM copy operation in view of the respective completion percentage for the first sub-operation and the second sub-operation of each storage component (e.g., volume) at the lowest level (e.g., volume level), and the first weight portion and the second portion for each storage component at the lowest level. As should be understood, determining the overall completion progress percentage of the VM copy operation may include determining the completion percentages for each of the storage components at each of the levels in the hierarchy, as described herein.

The overall completion progress percentage transmitting module 360 may transmit the overall completion progress percentage of the VM copy operation to facilitate display on the storage operation tracking user interface 132 on the client device 130. Additionally, the completion percentages for each storage component at each level of the hierarchy and the sub-operation completion percentages may be transmitted to facilitate display on the storage operation tracking user interface 132 on the client device 130.

Figure 4:
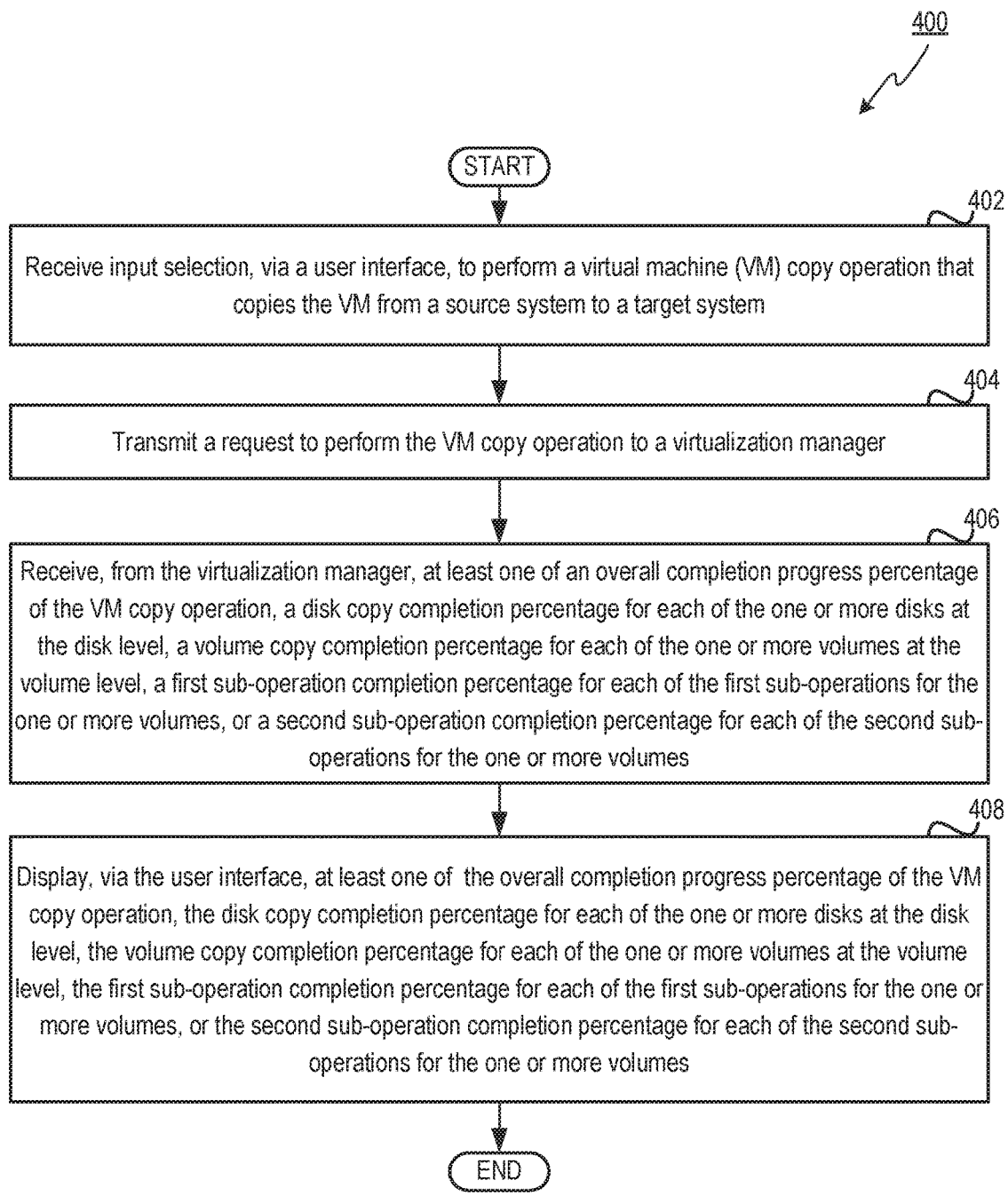
FIG. 4 depicts a flow diagram of an example method for tracking progress of storage operations via a storage operation tracking user interface on a client device, in accordance with one or more aspects of the present disclosure.

FIG. 4 depicts a flow diagram of an example method 400 for tracking progress of storage operations via a storage operation tracking user interface 132 of a client device 130, in accordance with one or more aspects of the present disclosure. Method 400 includes operations performed by the client device 130. Also, method 400 may be performed in the same or a similar manner as described above in regards to method 200. Method 400 may be performed by processing devices of the client device 130 and executing the storage operation tracking user interface (UI) 132. In an implementation, the storage operation tracking UI 132 may be received from the virtualization manager 110 and displayed via a browser on the client device 130 or any client-side application on the client device 130.

Method 400 may begin at block 402. At block 402, the processing device may receive input selection, via the storage operation tracking UI 132, to perform a VM copy operation that copies the VM 124 from the source system 120A to the target system 120B. The input selection may be received by a user selecting any suitable graphical element (e.g., button, radio list, etc.) on the storage operation tracking UI 132. In some implementations, multiple VMs may be selected to be copied. The VMs may be on the same source system 120A or different source systems and the VMs may be copied to the same target system 120B or different target systems.

As discussed above, the VM 124 may be associated with a hierarchy of storage components having a plurality of levels. The plurality of levels may include a disk level comprising one or more disks 126 associated with the VM 124 and a volume level comprising one or more volumes 128, each of the one or more volumes 128 being associated with one of the one or more disks 126, and the VM copy operation includes a first sub-operation (e.g., volume structure copy operation) and a second sub-operation (e.g., volume data copy operation) for each of the one or more volumes 128.

At block 404, the processing device may transmit a request to perform the VM copy operation to the virtualization manager 110. The virtualization manager 110 may transmit an execution instruction the source system 120A to perform the VM copy operation of the selected VM. The virtualization manager 110 may further identify the weights assigned to each storage component in the hierarchy and receive the completion percentages for the sub-operations from the source system 120A. The virtualization manager may determine the overall completion progress percentage of the VM copy operation in view of the respective sub-operation completion percentages and a first weight portion and a second weight portion of the sub-operations. Further, the virtualization manager 110 may determine the completion percentages for each storage component (e.g., volumes, disks) at each level in the hierarchy and transmit at least one of the completion percentages.

At block 406, the processing device of the client device 130 may receive, from the virtualization manager 110, at least one of an overall completion progress percentage of the VM copy operation, a disk copy completion percentage for each of the one or more disks 126 at the disk level, a volume copy completion percentage for each of the one or more volumes 128 at the volume level, a first sub-operation completion percentage for each of the first sub-operations (e.g., volume structure copy operations) for the one or more volumes 128, or a second sub-operation completion percentage for each of the second sub-operations (e.g., volume data copy operations) for the one or more volumes 128.

At block 408, the processing device may display, via the storage operation tracking UI 132, at least one of the overall completion progress percentage of the VM copy operation, the disk copy completion percentage for each of the one or more disks 126 at the disk level, the volume copy completion percentage for each of the one or more volumes 128 at the volume level, the first sub-operation completion percentage for each of the first sub-operations for the one or more volumes 128, or the second sub-operation completion percentage for each of the second sub-operations for the one or more volumes 128.

Figure 5:
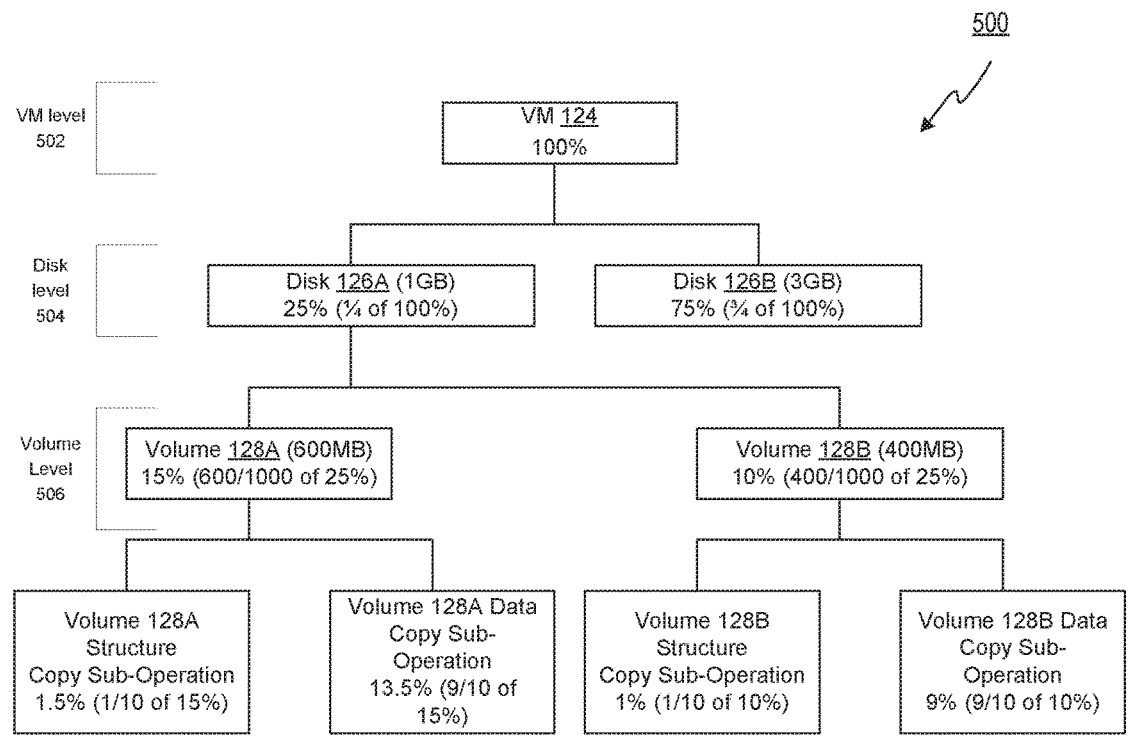
FIG. 5 depicts a hierarchy of storage components and operations including assigned weights, in accordance with one or more aspects of the present disclosure.

FIG. 5 depicts a hierarchy 500 of storage components and operations including assigned weights, in accordance with one or more aspects of the present disclosure. In an implementation, the hierarchy 500 may be displayed in the storage operation tracking UI 132 throughout the VM copy operation or upon request. Each storage component and/or sub-operation depicted may update its completion percentage in real-time or near real-time as the VM copy operation progresses. As depicted, the hierarchy 500 includes a set of levels: a VM level 502, a disk level 504, and a volume level 506. The volume level 502 is the top level and includes the VM 124, the volume level 506 is at the lowest level and includes the volumes 128A and 128B, and the disk level 504 is at a level preceding the volume level 506 and following the VM level 502 and includes the disks 126A and 126B. Each volume 128A and 128B includes a structure copy sub-operation and a volume data copy sub-operation.

The weights may be assigned by the storage operation tracking component 112 in view of at least one property of the storage components, a configuration setting, and/or a weight of a corresponding storage component at a preceding level in the hierarchy. For example, a configuration setting may indicate that the VM 124 be assigned a weight of 100 percent since it is at the top level (e.g., VM level 502) in the hierarchy, and just one VM is selected to be copied. To assign the weight to the disks 126A and 126B in the disk level 504, the storage operation tracking component 112 may obtain various properties of the disks 126A and 126B associated with the VM 124 from the source system 120A. Although the actual size of the storage component is used as an example in FIG. 5, it should be noted that other properties such as read/write speed of the storage components, state of the storage components, or the like may be used to assign the weights.

In the depicted example, the actual disk size of the disk 126A in the source storage 129A is 1 GB and the actual disk size of the disk 126B in the source storage 129A is 3 GB. An aggregate disk size (4 GB) for the disks 126A and 126B at the disk level may be obtained by summing the actual disk sizes (1 GB and 3 GB) of the disks 126A and 126B. Then, a disk size ratio for each of the disks 126A and 126B at the disk level 504 may be obtained by dividing the actual disk size for that disk 126A and 126B by the aggregate disk size. For example, the disk size ratio for disk 126A may be ¼ (1 GB for actual disk size divided by 4 GB for aggregate disk size) and the disk size ratio for disk 126B may be ¾ (3 GB for actual disk size divided by 4 GB for aggregate disk size). A weight may be assigned to each of the disks 126A and 126B at the disk level 504 in view of the associated disk size ratio and the weight of the VM 124 at the VM level 502. For example, a weight of 25 percent (¼ of 100 percent for weight assigned to VM 124) may be assigned to the disk 126A, and a weight of 75 percent (¾ of 100 percent for weight assigned to VM 124) may be assigned to the disk 126B.

Also, the storage operation tracking component 112 may assign weights to each volume 128A and 128B in the volume level 506 in view of the actual volume size and the weight of the corresponding disk (e.g., disk 126A) in the preceding level (e.g., disk level 504). The actual volume sizes may be obtained from the source system 120A. In the depicted example, the actual volume size of the volume 128A is 600 megabytes (MB) and the actual volume size of the volume 128B is 400 MB. The storage operation tracking component 112 may obtain an aggregate volume size (1000 MB) for the volumes 128A and 128B at the volume level 506 by summing the actual volume sizes (600 MB and 400 MB) of the volumes 128A and 128B at the volume level. Then, a volume size ratio for each of the volumes 128A and 128B at the volume level 506 may be obtained by dividing the actual volume size for that volume 128A and 128B by the aggregate volume size. For example, the volume size ratio for volume 128A may be ⅗ (600 MB for actual volume size divided by 1000 MB for aggregate volume size, which may be reduced to ⅗) and the volume size ratio for volume 128B may be ⅖ (400 MB for actual volume size divided by 1000 MB for aggregate disk size, which may be reduced to ⅖). A weight may be assigned to each of the volumes 128A and 128B at the volume level 506 in view of the associated volume size ratio and the weight of the corresponding disk 126A at the preceding level (e.g., disk level 504). For example, a weight of 15 percent (⅗ of 25 percent for weight assigned to disk 126A) may be assigned to the volume 128A, and a weight of 10 percent (⅖ of 25 percent for weight assigned to disk 126A) may be assigned to the volume 128B.

The storage operation tracking component 112 may also assign a weight to each of the sub-operations for each volume 128A and 128B in view of a configuration setting. For example, in some implementations, the configuration setting may specify a first ratio for the volume structure copy sub-operation and a second ratio for the volume data copy sub-operation. As noted above, the volume data copy sub-operation may take a longer amount of time than the volume structure copy sub-operation, and thus, a larger ratio may be specified in the configuration setting. In one example, the first ratio is ⅒ for the volume structure copy sub-operation and the second ratio is ⁹⁄₁₀ for the volume data copy sub-operation. However, it should be noted that any suitable ratio may be specified in the configuration setting.

To assign a first weight portion for the volume 128A structure copy sub-operation and a second weight portion for the volume 128A data copy sub-operation, the weight (15 percent) of the corresponding volume (volume 128A) may be divided in view of the first ratio and the second ratio. For example, a first weight portion of 1.5 percent (⅒ of 15 percent for the weight assigned to volume 128A) may be assigned to the volume 128A structure copy sub-operation and a second weight portion of 13.5 percent (⁹⁄₁₀ of 15 percent for the weight assigned to volume 128A) may be assigned to the volume 128A data copy sub-operation.

To assign a first weight portion for the volume 128B structure copy sub-operation and a second weight portion for the volume 128B data copy sub-operation, the weight (10 percent) of the respective volume (volume 128B) may be divided in view of the first ratio and the second ratio. For example, a first weight portion of 1 percent (⅒ of 10 percent for the weight assigned to volume 128B) may be assigned to the volume 128B structure copy sub-operation and a second weight portion of 9 percent (⁹⁄₁₀ of 10 percent for the weight assigned to volume 128B) may be assigned to the volume 128B data copy sub-operation.

Although a single VM 124A is depicted in the hierarchy 500, it should be understood that multiple VMs may be copied simultaneously. In such a case, the VM level 502 may include multiple VMs. The weights assigned to each may be divided based on the property of the storage components associated with each particular VM. For example, if two VMs are being copied and a first VM is associated with storage components having an actual size of 2 GBs and a second VM is associated with storage components having an actual size of 3 GBs, then an aggregate VM size may be determined to be 5 GBs. A ratio for the first VM may be determined to be ⅖ (2 GBs divided by aggregate VM size of 5 GBs) and a ratio for the second VM may be determined to be ⅗ (3 GB divided by aggregate VM size of 5 GBs). As such, the first VM may be assigned a weight of 40 percent (⅖ of 100 percent) and the second VM may be assigned a weight of 60 percent (⅗ of 100 percent). The weights for the storage components associated with the respective VMs may be determined as described above in view of the assigned weights for the VMs.

During the VM copy operation, the application (e.g., VDSM) executing sub-operations on the source system 120A may provide respective completion percentages for the sub-operations to the virtualization manager 110. The storage operation tracking component 112 may determine a first sub-operation copy completion percentage for the first sub-operation of each volume 128A and 128B by multiplying the respective completion percentage for the first sub-operation by the first weight portion. For example, the completion percentage for the volume 128A structure copy sub-operation may be reported as 100 percent for the volume 128A and may be reported as 50 percent for the volume 128B. Thus, the first sub-operation copy completion percentage for the volume 128A structure copy operation is 1.5 percent (100 percent multiplied by 1.5 percent weight assigned to the volume 128A structure copy sub-operation). The first sub-operation copy completion percentage for the volume 128B structure copy operation is 0.5 percent (50 percent multiplied by the 1 percent weight assigned to the volume 128B structure copy sub-operation).

The storage operation tracking component 112 may determine a second sub-operation copy completion percentage for the first sub-operation of each volume 128A and 128B by multiplying the respective completion percentage for the second sub-operation by the second weight portion. For example, the completion percentage for the volume 128A data copy sub-operation may be 50 percent for the volume 128A. The completion percentage for the volume 128B data copy sub-operation may be 0 percent for the volume 128B because the volume 128B structure copy sub-operation has not completed. Thus, the second sub-operation copy completion percentage for the volume 128A data copy operation is 6.75 percent (50 percent multiplied by 13.5 percent weight assigned to the volume 128A data copy sub-operation). The second sub-operation copy completion percentage for the volume 128B data copy operation is 0 percent (0 percent multiplied by the 9 percent weight assigned to the volume 128B data copy sub-operation).

The completion percentage for the volume 128A and the volume 128B at the lowest level (e.g., volume level 506) may be determined by summing the respective first sub-operation copy completion percentage for the first sub-operation with the respective second sub-operation copy completion percentage for the second sub-operation. For example, summing the first sub-operation copy completion percentage (e.g., 1.5 percent) for the volume 128A structure copy sub-operation and the second sub-operation copy completion percentage (e.g., 6.75) for the volume 128A data copy sub-operation may result in a 8.25 percent volume copy completion percentage for the volume 128A. Summing the first sub-operation copy completion percentage (e.g., 0.5 percent) for the volume 128B structure copy sub-operation and the second sub-operation copy completion percentage (e.g., 0 percent) for the volume 128B data copy sub-operation may result in 0.5 percent volume copy completion percentage for the volume 128B.

The completion percentage for the disks 126A and 126B at a preceding level in the hierarchy that precedes the lowest level (e.g., volume level 506) may be determined. For example, to determine a disk copy completion percentage for the disk 126A, the volume copy completion percentage (e.g., 8.25 percent) of the volume 128A and the volume copy completion percentage (0.5 percent) of the volume 128B may be summed, resulting in 8.75 percent. For purposes of illustration, it may be understood that the disk copy completion percentage for the disk 126B is determined to be 75 percent (the disk and its associated volumes have been fully copied to the target storage 129B).

The overall completion progress percentage for the VM copy operation may then be determined by summing the disk copy completion percentages for each disk 126A and 126B in the disk level 504. For example, the disk copy completion percentage (e.g., 8.75 percent) for the disk 126A may be summed with the disk copy completion percentage (e.g., 75 percent) to result in an overall completion progress percentage for the VM 124 of 83.75 percent. In an implementation, at least one of the overall completion progress percentage of the VM 124 at the VM level 502, the disk copy completion percentage for each of the disks 126A and 126B at the disk level 504, the volume copy completion percentage for each of the volumes 128A and 128B at the volume level 506, the first sub-operation completion percentage for each of the volume structure copy sub-operations for the volumes 128A and 128B, or the second sub-operation completion percentage for each of the volume data copy sub-operations for the volumes 128A and 128B may be transmitted to facilitate display in the storage operation tracking user interface 132 on the client device 130. In one implementation, the completion percentages may be displayed in hierarchy form to enable a viewer to granularly visualize accurate progresses of various storage components associated with the VM being copied.

Figure 6:
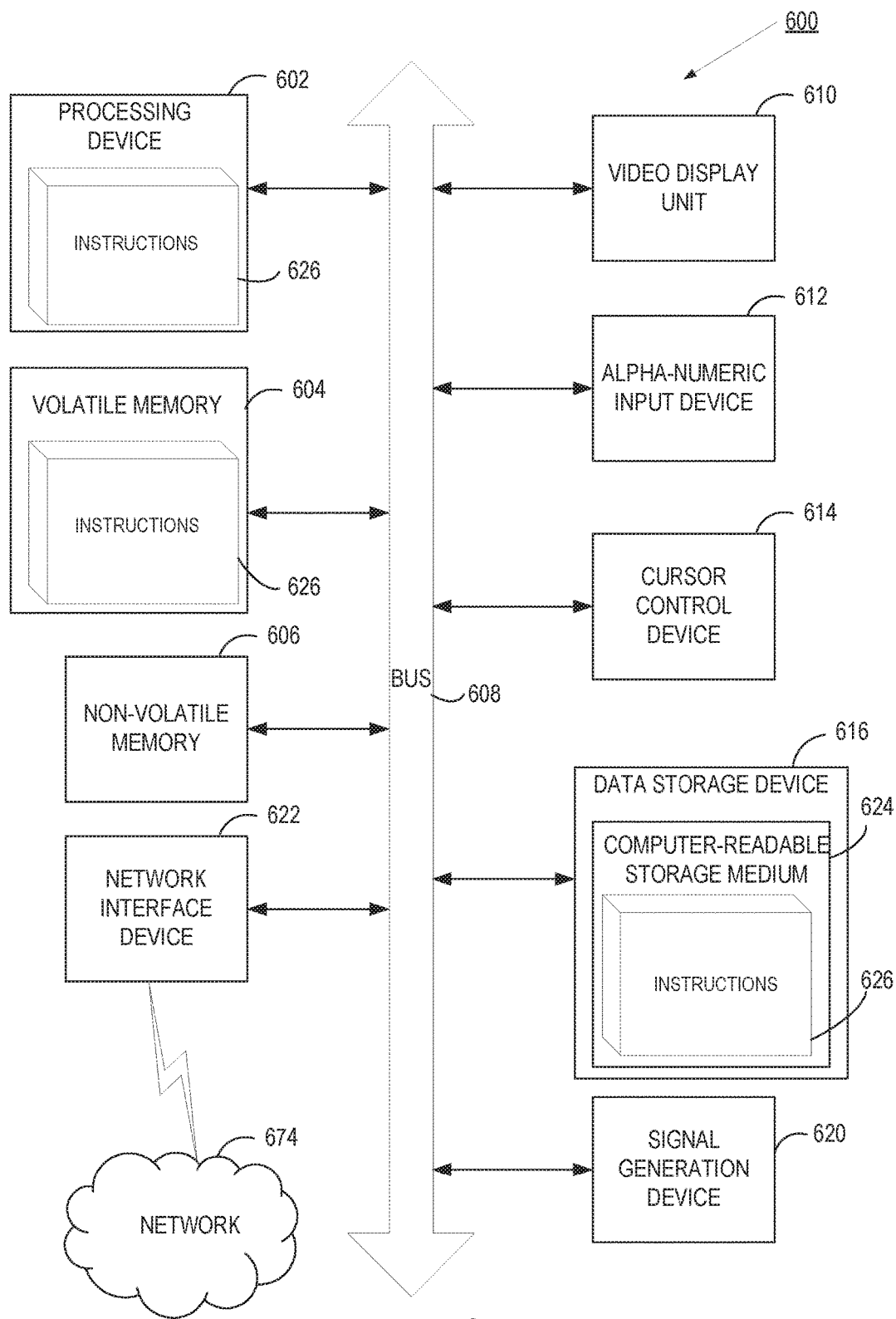
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to a computing device within system architecture 100 of FIG. 1. In one implementation, the computer system 600 may be the client device 130. In one implementation, the computer system 600 may host the virtualization manager 110. The computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions encoding storage operation tracking component 112 of FIG. 1 for implementing method 200, or instructions on the client device executing method 400.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200 and 400, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
   receiving a request to perform a virtual machine (VM) copy operation that copies the VM from a source system to a target system, wherein the VM is associated with a hierarchy of storage components, the hierarchy of storage components having a plurality of levels, the plurality of levels comprising a disk level comprising one or more disks associated with the VM and a volume level comprising one or more volumes, each of the one or more volumes being associated with one of the one or more disks, and the VM copy operation includes a first sub-operation and a second sub-operation for each volume at a lowest level in the hierarchy;
   transmitting an execution instruction to the source system, the execution instruction to cause the source system to perform the VM copy operation to copy the VM to the target system;
   identifying a weight assigned to each disk and volume in the hierarchy, the weight being based on at least one property of the respective disk or volume, wherein a weight of the respective volume at the lowest level is divided into a first weight portion for the first sub-operation and a second weight portion for the second sub-operation of the respective volume;
   receiving, from the source system, a respective completion percentage for the first sub-operation and the second sub-operation of each volume at the lowest level;
   determining an overall completion progress percentage of the VM copy operation in view of the respective completion percentage for the first sub-operation and the second sub-operation of each volume at the lowest level, and the first weight portion and the second weight portion for each volume at the lowest level; and
   transmitting the overall completion progress percentage of the VM copy operation, wherein the transmitting is to cause display of the overall completion progress percentage of the VM copy operation on a user interface.

2. The method of claim 1, wherein determining the overall completion progress percentage of the VM copy operation comprises:
   determining a first sub-operation completion percentage for the first sub-operation of each volume at the lowest level, wherein determining the first sub-operation completion percentage for the first sub-operation of each volume comprises multiplying the respective completion percentage for the first sub-operation by the first weight portion for each volume at the lowest level;
   determining a second sub-operation completion percentage for the second sub-operation of each volume at the lowest level, wherein determining the second sub-operation completion percentage for the second sub-operation of each volume comprises multiplying the respective completion percentage for the second sub-operation by the second weight portion for each volume at the lowest level;
   determining, for each of the corresponding volumes at the lowest level, a first storage component copy completion percentage by summing the first sub-operation completion percentage for the first sub-operation and the second sub-operation completion percentage for the second sub-operation for each corresponding volume at the lowest level;
   determining, for each disk at a preceding level in the hierarchy that precedes the lowest level, a second storage component copy completion percentage by summing first storage component copy completion percentages of the corresponding volumes at the lowest level that are associated with each of the storage components at the preceding level; and
   determining the overall completion progress percentage for the VM copy operation by summing second storage component copy completion percentages of each of the disks at the preceding level.

3. The method of claim 2, wherein transmitting the overall completion progress percentage of the VM copy operation comprises transmitting at least one of the first sub-operation completion percentage, the second sub-operation completion percentage, the first storage component copy completion percentage, or the second storage component copy completion percentage, and wherein the transmitting is to cause display of the first sub-operation completion percentage, the second sub-operation completion percentage, the first storage component copy completion percentage, or the second storage component copy completion percentage on the user interface.

4. The method of claim 1, wherein the first sub-operation comprises a storage component structure copy operation and the second sub-operation comprises a storage component data copy operation.

5. The method of claim 1, further comprising:
   determining a weight assigned to each disk and volume in the hierarchy; and
   storing the weight assigned to each disk and volume in the hierarchy in a data store.

6. The method of claim 5 wherein:
   the lowest level is a volume level, a preceding level that precedes the lowest level in the hierarchy is a disk level, and a top level in the hierarchy is a VM level; and
   determining the weight assigned to each disk and volume in the hierarchy comprises:
      obtaining a first aggregate storage component size for each disk at the disk level by summing first actual storage component sizes of each disk at the disk level;
      obtaining a first storage component size ratio for each of each disk at the disk level by dividing the first actual storage component size for that disk by the first aggregate storage component size; and assigning the weight to each disk at the disk level in view of the first storage component size ratio, and the weight of the VM at the VM level.

7. The method of claim 6, further comprising:
obtaining a second aggregate storage component size for each volume at the volume level by summing second actual storage component sizes of each volume at the volume level;
obtaining a second storage component size ratio for each volume at the volume level by dividing the second actual storage component size for that volume by the second aggregate storage component size; and
assigning the weight to each volume at the volume level in view of the second storage component size ratio, and the weight of each disk at the disk level.

8. The method of claim 1, wherein the plurality of levels comprise a VM level at a top level in the hierarchy, a volume level being the lowest level in the hierarchy, and a disk level preceding the volume level and following the VM level.

9. The method of claim 1, wherein the at least one property comprises one or more of an actual storage component size, storage component read speed, storage component write speed, or storage status of the storage component.

10. The method of claim 1, wherein the weight of the corresponding volume at the lowest level is divided into the first weight portion for the first sub-operation and the second weight portion for the second sub-operation of the corresponding volume in view of one or more of a preconfigured setting, or an actual storage component size of the corresponding volume.

11. A system,
a memory;
a processing device operatively coupled to the memory to execute a virtualization manager, the processing device to:
receive a request to perform a virtual machine (VM) copy operation that copies the VM from a source system to a target system, wherein the VM is associated with a hierarchy of storage components, the hierarchy of storage components having a plurality of levels, the plurality of levels comprising a disk level comprising one or more disks associated with the VM and a volume level comprising one or more volumes, each of the one or more volumes being associated with one of the one or more disks, and the VM copy operation includes a first sub-operation and a second sub-operation for each volume at a lowest level in the hierarchy;
transmit an execution instruction to the source system, the execution instruction to cause the source system to perform the VM copy operation to copy the VM to the target system;
identify a weight assigned to each disk and volume in the hierarchy, the weight being based on at least one property of the respective disk or volume, wherein a weight of the respective volume at the lowest level is divided into a first weight portion for the first sub-operation and a second weight portion for the second sub-operation of the respective volume;
receive, from the source system, a respective completion percentage for the first sub-operation and the second sub-operation of each volume at the lowest level;
determine an overall completion progress percentage of the VM copy operation in view of the respective completion percentage for the first sub-operation and the second sub-operation of each volume at the lowest level, and the first weight portion and the second weight portion for each volume at the lowest level; and
transmit the overall completion progress percentage of the VM copy operation, wherein the transmitting is to cause display of the overall completion progress percentage of the VM copy operation on a user interface.

12. The system of claim 11, wherein the processing device is further to:
determine a first sub-operation completion percentage for the first sub-operation of each volume at the lowest level, wherein determining the first sub-operation completion percentage for the first sub-operation of each volume comprises multiplying the respective completion percentage for the first sub-operation by the first weight portion for each volume at the lowest level;
determine a second sub-operation completion percentage for the second sub-operation of each volume at the lowest level, wherein determining the second sub-operation completion percentage for the second sub-operation of each volume comprises multiplying the respective completion percentage for the second sub-operation by the second weight portion for each volume at the lowest level;
determine, for each of the corresponding volumes at the lowest level, a first storage component copy completion percentage by summing the first sub-operation completion percentage for the first sub-operation and the second sub-operation completion percentage for the second sub-operation for each corresponding volume at the lowest level;
determine, for each disk at a preceding level in the hierarchy that precedes the lowest level, a second storage component copy completion percentage by summing first storage component copy completion percentages of the corresponding volumes at the lowest level that are associated with each of the storage components at the preceding level; and
determine the overall completion progress percentage for the VM copy operation by summing second storage component copy completion percentages of each of the disks at the preceding level.

13. The system of claim 12, wherein transmitting the overall completion progress percentage of the VM copy operation comprises the processing device further to transmit at least one of the first sub-operation completion percentage, the second sub-operation completion percentage, the first storage component copy completion percentage, or the second storage component copy completion percentage, and wherein the transmitting is to cause display of the at least one of the first sub-operation completion percentage, the second sub-operation completion percentage, the first storage component copy completion percentage, or the second storage component copy completion percentage on the user interface.

14. The system of claim 11, wherein the first sub-operation comprises a storage component structure copy operation and the second sub-operation comprises a storage component data copy operation.

15. The system of claim 11, wherein the processing device further to:
determine a weight assigned to each disk and volume in the hierarchy; and
store the weight assigned to each disk and volume in the hierarchy in a data store.

16. The system of claim 15, wherein the lowest level is a volume level, a preceding level that precedes the lowest level in the hierarchy is a disk level, and a top level in the hierarchy is a VM level, and the processing device further to:
    determine the weight assigned to each disk and volume in the hierarchy comprises:
        obtain a first aggregate storage component size for each disk at the disk level by summing first actual storage component sizes of each disk at the disk level;
        obtain a first storage component size ratio for each of each disk at the disk level by dividing the first actual storage component size for that disk by the first aggregate storage component size; and
        assign the weight to each disk at the disk level in view of the first storage component size ratio, and the weight of the VM at the VM level.

17. The system of claim 16, wherein the processing device further to:
    obtain a second aggregate storage component size for each volume at the volume level by summing second actual storage component sizes of each volume at the volume level;
    obtain a second storage component size ratio for each volume at the volume level by dividing the second actual storage component size for that volume by the second aggregate storage component size; and
    assign the weight to each volume at the volume level in view of the second storage component size ratio, and the weight of each disk at the disk level.

18. One or more tangible, non-transitory computer-readable media including instructions that, when executed, cause one or more processors to:
    receive input selection, via a user interface, to perform a virtual machine (VM) copy operation that copies the VM from a source system to a target system, wherein the VM is associated with a hierarchy of storage components, the hierarchy of storage components having a plurality of levels, the plurality of levels comprising a disk level comprising one or more disks associated with the VM and a volume level comprising one or more volumes, each of the one or more volumes being associated with one of the one or more disks, and the VM copy operation includes a first sub-operation and a second sub-operation for each of the one or more volumes;
    transmit a request to perform the VM copy operation, wherein the request is to cause a virtualization manager to perform the VM copy operation;
    identify a weight assigned to each disk and volume in the hierarchy, the weight being based on at least one property of the respective disk or volume, wherein a weight of the respective volume at the lowest level is divided into a first weight portion for the first sub-operation and a second weight portion for the second sub-operation of the respective volume;
    receive, from the source system, a respective completion percentage for the first sub-operation and the second sub-operation of each volume at the lowest level;
    determine an overall completion progress percentage of the VM copy operation in view of the respective completion percentage for the first sub-operation and the second sub-operation of each volume at the lowest level, and the first weight portion and the second weight portion for each volume at the lowest level; and
    transmit the overall completion progress percentage of the VM copy operation, wherein the transmitting is to cause display of the overall completion progress percentage of the VM copy operation on a user interface.

19. The non-transitory computer-readable media of claim 18, wherein the one or more processors are further caused to:
    transmit at least one of the first sub-operation completion percentage, the second sub-operation completion percentage, the first storage component copy completion percentage, or the second storage component copy completion percentage, wherein the transmitting is to cause display of the at least one of the first sub-operation completion percentage, the second sub-operation completion percentage, the first storage component copy completion percentage, or the second storage component copy completion percentage on the user interface.

20. The non-transitory computer-readable media of claim 18, wherein:
    the first sub-operation completion percentage for the first sub-operation of each of the one or more volumes at the volume level is determined by multiplying the respective completion percentage for the first sub-operation by the first weight portion for each of the one or more volumes at the volume level;
    the second sub-operation completion percentage for the second sub-operation of each of the one or more volumes at the volume level is determined by multiplying the respective completion percentage for the second sub-operation by the second weight portion for each of the one or more volumes at the volume level;
    for each of the corresponding volumes at the volume level, the volume copy completion percentage is determined by summing the first sub-operation completion percentage for the first sub-operation and the second sub-operation completion percentage for the second sub-operation for each corresponding volume at the volume level;
    for each of the one or more disks at the disk level, the disk copy completion percentage is determined by summing volume copy completion percentages of the corresponding volumes at the volume level that are associated with each of the of the one or more disks at the disk level; and
    the overall completion progress percentage for the VM copy operation is determined by summing disk copy completion percentages of each of the one or more disks at the disk level.

* * * * *